April 18, 1961 T. L. MELL 2,980,852
IMPEDANCE MEASURING NETWORKS
Filed March 18, 1958 2 Sheets-Sheet 1
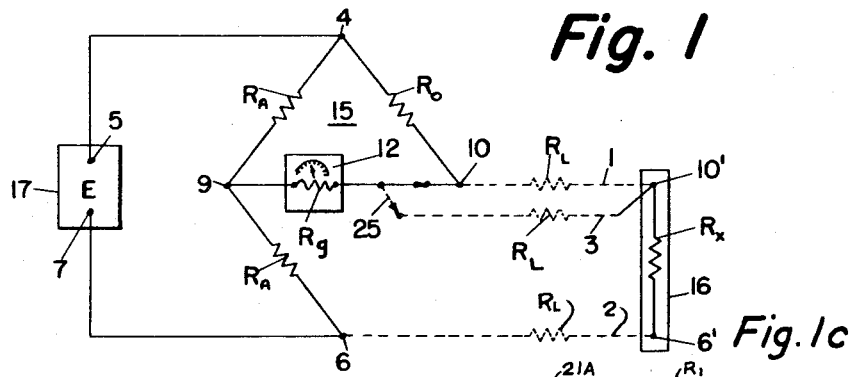
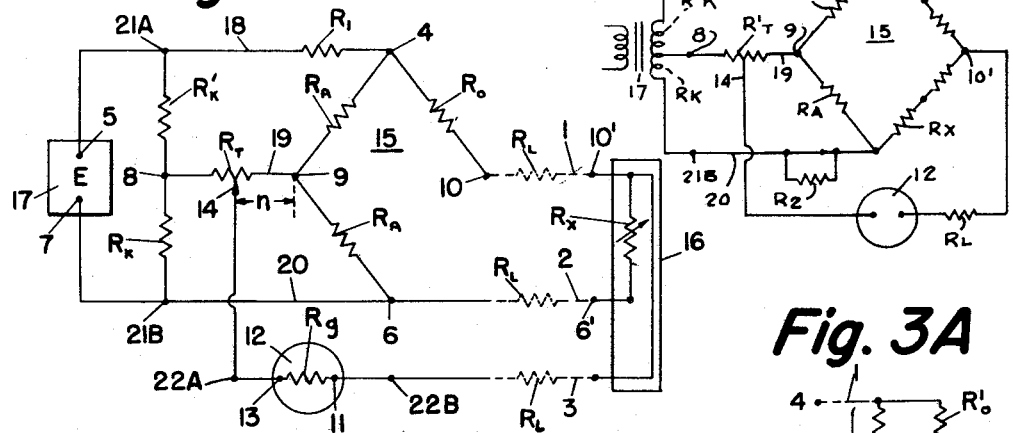
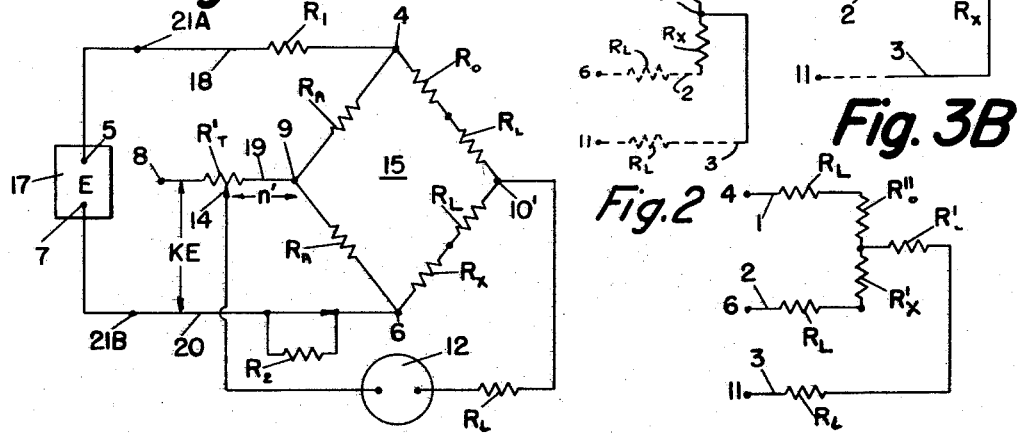

United States Patent Office 2,980,852
Patented Apr. 18, 1961

2,980,852

IMPEDANCE MEASURING NETWORKS

Thomas L. Mell, 501 Dorset Road, Devon, Pa.

Filed Mar. 18, 1958, Ser. No. 722,308

13 Claims. (Cl. 324—57)

This invention relates to networks for the measurement of impedances responsive to the changes in magnitude of a condition for indicating, recording or control purposes, and particularly relates to measuring networks in which one or more condition-responsive impedances are remotely located with respect to the other components of the network.

In accordance with the present invention, the measuring network includes an unbalanced Wheatstone bridge having condition-responsive impedance means in one or more of its arms to produce an output voltage which varies with changes of the condition. The network additionally includes potential-divider impedance means connected to one pair of bridge terminals, either or both of the connections including impedance means, and a second potential-divider impedance means connected between a third terminal of the bridge and a tap of the first potential divider. The measuring network has conjugate pairs of terminals to which a current supply source and a balance detector are connected. The terminals of the first potential divider provide one of the pairs of network terminals and the fourth bridge terminal and an intermediate tap of the second potential divider provide the other pair of network terminals. Balance of the network to measure the existing magnitude of the condition, or to set the control point at which the condition is to be maintained, is preferably effected by adjustment of the tap of the second potential divider.

Further in accordance with the invention and as hereinafter more fully explained, the relative magnitudes of the additional impedance means and their characteristics may be preselected to obtain compensation for one or more installations or operational variables, such as length of leads to remote components, variations in supply voltage and effects of temperature upon the span or zero of the measuring range.

The invention further resides in measuring networks having other novel and useful features hereinafter described and claimed.

For a more detailed understanding of the invention and for illustration of exemplary embodiments thereof, reference is made in the following description to the accompanying drawings in which:

Fig. 1 schematically illustrates a conventional unbalanced Wheatstone bridge having a remote condition-responsive impedance;

Fig. 1A schematically illustrates a measuring network embodying the invention;

Figs. 1B and 1C are the electrical equivalent of Fig. 1A and are referred to in analysis thereof;

Fig. 2 is a modification of the remote part of the network of Fig. 1A;

Fig. 3A illustrates another modification of the remote part of the network of Fig. 1A;

Fig. 3B is the electrical equivalent of Fig. 3A and is referred to in analysis thereof;

Figure 4:
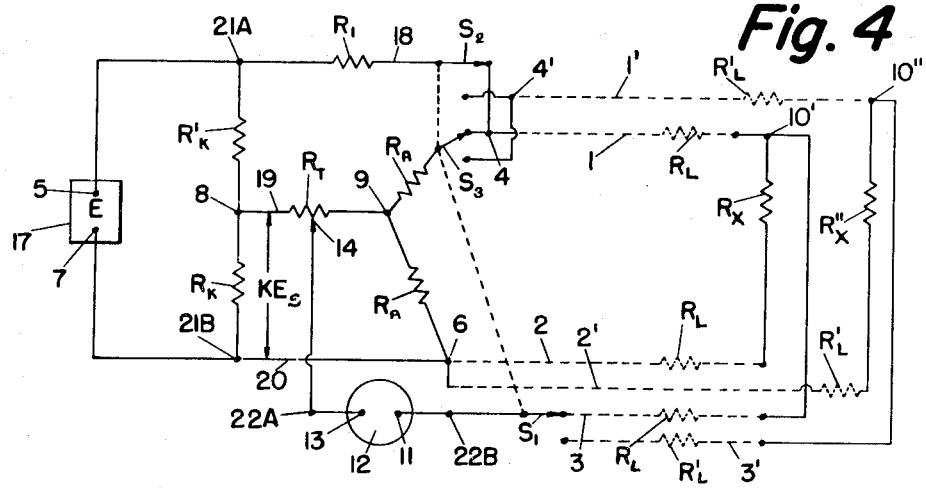
Figure 5A:
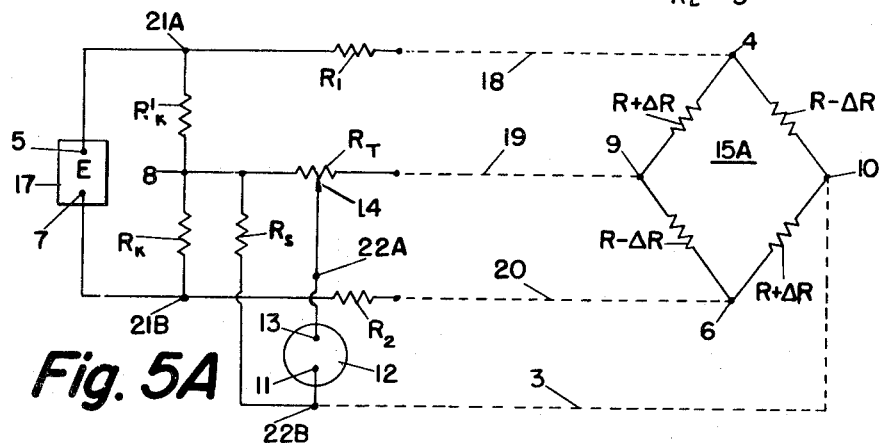
Figure 5B:
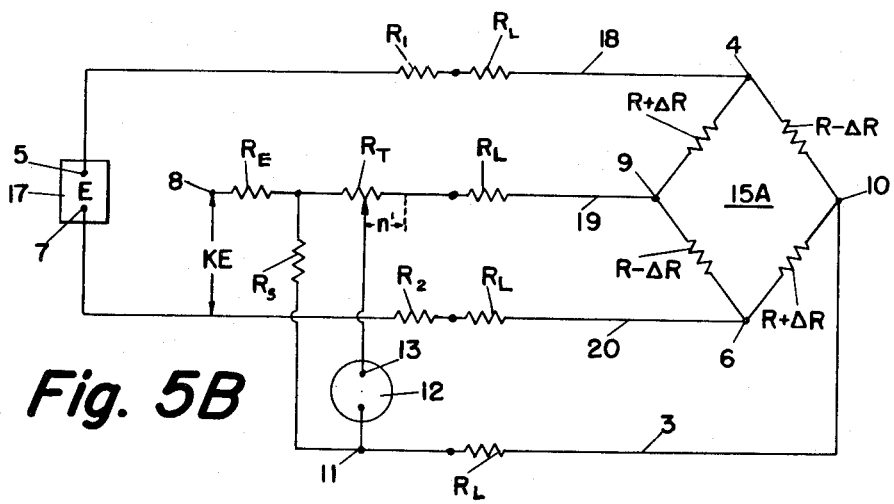

Fig. 4 generally corresponds with Fig. 1A with inclusion of switches for selection of different condition-responsive impedances;

Fig. 5A is a modification of Fig. 1A in which the impedances of all bridge arms are remote and condition-responsive; and Fig. 5B is the electrical equivalent of Fig. 5A and is referred to in analysis thereof.

In order that some aspects of the invention may be better understood, there are first briefly discussed problems arising with conventional measuring networks of the unbalanced Wheatstone bridge type. Referring to Fig. 1, the measuring network 15 consists of a Wheatstone bridge, one of whose arms (between terminals 6 and 10) includes a strain-gage, a resistance thermometer, a conductivity cell, or other condition-responsive device 16 whose impedance $R_X$ is to be determined as a measure of the existing magnitude of the condition. The responsive device 16 as installed is remote from the other arms of the bridge and its terminals 6', 10' are connected to the arm terminals 6 and 10 by leads 1 and 2, each having appreciable distributed impedance $R_L$ which is usually different for different installations. An indicating or recording device 12 having an effective resistance $R_g$ is connected between the output terminals 9, 10 of the bridge and a source 17 of supply voltage E is connected to the input terminals 4, 6 of the bridge.

As is usual and for simplicity of explanation, the ratio arms 4—9 and 9—6 of the bridge are of equal resistance $R_A$. It is usual practice and it is here assumed the detector 12 has been precalibrated for a given reference impedance $R_0$ and a given value of voltage E of the supply source 17.

It can be shown that the current ($I_g$) flowing between the output terminals 9, 10 of the bridge to energize the detector 12 may be expressed as (1)
$$I_g = \frac{E(R_X + 2R_L - R_0)}{R_A(R_0 + 2R_L + R_X) + 2[(R_0 + 2R_L + R_X)R_g + R_0(2R_L + R_X)]}$$

From Equation 1, it is evident that the magnitude of the output current of the bridge 15 varies not only with the measured variable affecting $R_X$ but also with the supply voltage E of the bridge and with $R_L$ (the lead resistance) which is different for different installations and which in a given installation varies with changes in ambient temperature.

If a third lead (3) is provided for connecting the detector 12 between terminal 9 of the bridge and the terminal 10' of the remote condition-responsive impedance $R_X$ (as occurring for the dotted line position of switch 25), the output current of the bridge flowing through detector 12 may be expressed as (1A)
$$I_g = \frac{E(R_X - R_0)}{(R_0 + R_X + 2R_L)(R_A + 2R_g) + 2(R_0 + R_L)(R_X + R_L)}$$

From Equation 1A, it will be noted that again the magnitude of the output current of the bridge varies not only with the measured variable affecting $R_X$ but also with the supply voltage E of the bridge: It also varies with the lead resistance $R_L$ except for the single point when $R_X$ equals $R_0$ if such point is within the measuring range.

In the past, various circuits have been devised for compensation of lead resistance but they have been only partially effective or have required regulated or multiple power supplies, additional conductors or extra balancing or standardizing equipment. For example, the Kelvin bridge circuit requires four leads to the remote impedance and involves balancing adjustment of more than one impedance. Another circuit using three leads to the remote impedance requires balancing by adjustment of two impedances or affords compensation for lead resistance at only one point in the measuring range as discussed in connection with Fig. 1.

With the network of the present invention, independence of lead resistance throughout the range of measurement may be attained by using only a single current power supply source, which source need not be regulated or standardized, one balancing impedance and three leads to the remote condition-responsive impedance.

Now referring to Fig. 1A, the current supplied to the bridge 15 traverses an impedance $R_1$ connected between input terminal 4 of the bridge and network terminal 21A which in Fig. 1A is connected to terminal 5 of the current source 17 whose voltage E need not be regulated or standardized. The resistors $R_K$ and $R'_K$ are connected across the network terminal 21A, 21B which in Fig. 1A are connected to the terminals of the supply source. The resistors $R_K$, $R'_K$ serve as a voltage divider whose junction point or intermediate tap 8 is connected to one of the output terminals 9 of the bridge through a second voltage divider exemplified by slidewire $R_T$. One terminal 13 of the balance detector is connected to the intermediate tap 14 of slidewire $R_T$ and the other terminal 11 of the detector is connected by lead 3 to the terminal 10' of the remote condition-responsive impedance $R_X$. Although the lead length is different for different installations, in any given installation the lengths of the leads are the same and their resistances $R_L$ are always equal to each other despite changes in ambient conditions including temperature. In Fig. 1A, the voltage across the detector 12 has two components. One is the unbalance output voltage of the bridge 15 and varies with changes in magnitude of condition-responsive impedance $R_X$, and the other depends upon the difference in potential between the output terminal of the bridge 15 and the terminal 8 of the potential divider network $R_K$, $R'_K$. In use of the measuring network, the bridge 15 is always unbalanced, but the aforesaid two voltage components, in manner later described, are caused to be equal and opposite for balance of the detector 12. In order that the condition of such detector balance shall not be affected by the resistance of the leads to the condition-responsive impedance $R_X$, the values of the additional impedances $R_1$, $R_K$, $R'_K$ and $R_A$ are preselected to have relationships below discussed. The magnitude and variations in magnitude of the supply voltage E do not affect the accuracy of the measurements because although the Wheatstone bridge 15 is unbalanced, the network as a whole is in balance at the time of measurement.

For simplicity of analysis and explanation, reference is made to Fig. 1B, which is the electrical equivalent of Fig. 1A, with the first voltage divider $R_K$, $R'_K$ replaced by a phantom current source whose output voltage KE is proportional to the voltage E of source 17 and whose effective series-resistance is combined with the resistance $R_T$.

Expressed mathematically, the output voltage of the phantom source is $$(2) \qquad KE = \frac{R_K}{R_K + R'_K} E$$

and the total effective resistance between terminals 8 and 9 of the network is $$(3) \qquad R'_T = R_T + \frac{R_K R'_K}{R_K + R'_K}$$

It can be shown by analysis of Fig. 1B that the voltages applied to detector 12 are in balance for any finite value of the supply voltage E when the following relation is established:

$$(4) \quad KR_1(R_A + 2n'R'_T) = (R_X + R_L)\left[ R'_T + R_A(1-K) \right.$$
$$\left. - Kn'R'_T\left(\frac{R_1}{R_A} + 2 - \frac{1}{K}\right)\right] - (R_0 + R_L)\left[ R'_T \right.$$
$$\left. + K(R_1 + R_A) + Kn'R'_T\left(\frac{R_1}{R_A} + 2 - \frac{1}{K}\right)\right]$$

(where $n'$ is the fraction of $R'_T$ included between points 14 and 9).

By inspection of Equation 4 and collection of the $R_L$ terms, it appears that balance of the voltage components applied to detector 12 is also independent of the lead resistance for the additional relation that $$(5) \quad R_A - K(R_1 + 2R_A) - 2Kn'R'_T\left(\frac{R_1}{R_A} + 2 - \frac{1}{K}\right) = 0$$

Equation 5 is satisfied when the relative values of $R_K$ and $R'_K$ are so chosen that the proportionality factor K of Equation 2 is $$(6) \qquad K = \frac{R_A}{R_1 + 2R_A}$$

Substituting this value of K in the original balance, Equation 4, the condition for balance becomes simply $$(7) \quad (R_X - R_0)[R'_T(2R_A + R_1) + R_A + R_1]$$
$$= R_A R_1 (R_A + 2n'R'_T)$$

It is to be noted from Equation 7 that the balance of the detector now depends only upon the difference in resistance between the reference resistance $R_0$ and the condition-responsive resistance $R_X$; the balance is wholly independent of the resistances $R_L$ of the leads. Furthermore, since Equation 7 also includes the conditions of Equation 4, the detector balance is also independent of variations in the supply voltage E regardless of whether or not such variations occur concurrently with variations in lead resistance due, for example, to changes in ambient temperature. The magnitude, and variations of magnitude, of the resistance of the lead 3 is not of consequence because no current flows through it at the time the measurement is made. The leads 1 and 2 are in the bridge arms and therefore are always traversed by current, the magnitude of which varies with the supply voltage as well as the extent of unbalance of the bridge portion of the entire network. However, in Fig. 1A, as distinguished from Fig. 1, the leads are in adjacent arms of the bridge, and since their resistances are always equal, the lead resistance has no effect upon the difference in resistance between these two adjacent arms.

Although Equations 2 to 7 are expressed in terms of resistance for networks composed only of resistive impedances, it is to be understood that they also apply to networks, in whole or in part, composed of impedances having reactance. In such case, as will be undertood by those skilled in the art, the resistance terms will be replaced by vector terms, and the balance equation will have real and reactive balances, both of which must be satisfied. Also when the supply source 17 is a transformer having a suitably tapped winding, the end terminals of the winding are connected as in Fig. 1C, to terminals 21A, 21B of the network and the tap of the winding serves as point 8 of the network. Thus, the winding impedances on opposite sides of the tap serve as the potential-dividing impedances $R_K$, $R'_K$.

From the foregoing discussion of Fig. 1B, it should be evident that the detector balance remains independent of the lead resistances and of the supply voltage when, as in Fig. 2, both the condition-responsive resistance $R_X$ and the reference resistance $R_0$ are remotely located. Such disposition of all, or part, of the reference resistance may be resorted to, as later discussed, in order that errors due for example to ambient temperature may be minimized.

It is to be noted that the measuring network may also include another resistor ($R_2$, Fig. 1B) in the line from terminal 6 of the bridge to network terminal 21B connected to terminal 7 of the supply source. Although such resistance would not ordinarily be deliberately added in the network of Fig. 1A, it may be unavoidably present. In such case, the proportionality factor K Equation 6 of the phantom source KE Equation 2 becomes $$(8) \quad K = \frac{R_A + R_2}{R_1 + R_2 + 2R_A} = \frac{R_K}{R_K + R'_K}$$

It is to be noted that the positions of the current supply source 17 and the detector 12 may be interchanged without affecting the compensations above discussed. In brief, the network terminals 21A, 21B (Fig. 1A) of the first potential divider $R_K$, $R'_K$ are conjugate to the network terminals 22A, 22B, so that such interchange of the current source and the detector does not affect the condition of balance of the detector. This is also true of the other modifications later herein discussed.

As evident from Equation 7, any one of the impedances $R_0$, $R_T$ or $n'$ may be adjustable to effect balance of the detector 12 and may be pre-calibrated for direct measurement of the variations in magnitude of impedance $R_X$, or of a condition to which it is responsive, without need for re-calibration for installations requiring different lengths of leads and without need for regulation or standardization of the source voltage E.

The preferred method of balancing the detector is to make the term $n'$ variable, in which case all, or part, of impedance $R_T$ may conveniently be a slidewire with an adjustable tap or point such as contact 14. In such case $$(9) \quad n' = (R_X - R_0) C - \frac{R_A}{2R_T^1}$$

where $$C = \frac{1}{2R_1}\left[\frac{R_A + R_1}{R'_T} + 2 + \frac{R_1}{R_A}\right]$$

From Equation 9, it will be appreciated that the fraction $n'$ is a linear function of the measured variable. This is of advantage when the slidewire setting is reproduced in a computing circuit and also provides, in a self-balancing indicator or recorder, for evenly graduated scales, charts or dials. Also since the detector is connected to contact 14, through which no current flows at balance, the slidewire characteristic may be modified as desired by shunting techniques used in conventional potentiometer circuits. Since the fraction $n'$ cannot physically have a negative value, the measuring range starts at a point where $R_X$ is slightly greater than $R_0$. Therefore when required, an additional resistance may be included in the $R_X$ arm of the bridge to insure positive values of $n'$ throughout the range of variation of $R_X$.

It will be understood that detector 12 may simply be a sensitive current-responsive device such as a galvanometer and that rebalancing adjustment may be effected manually: or that the detector may include a current or voltage amplifier whose output controls a reversible motor to effect the rebalancing adjustment and concurrently to adjust a recorder pen, an indicating pointer, an integrator, or a control mechanism—all as in conventional measuring instruments. Alternatively, the network may be manually set for balance at a control point, as indicated on a dial or scale, corresponding with a desired magnitude of perssure or other condition and the response of detector 12 utilized to actuate relays or other devices for control of the condition to which the resistance $R_X$ is responsive. The foregoing also applies to all of the modifications later described.

In many types of measurement, the impedance $R_X$ is not only responsive to variations of the condition under measurement, but also to variations of an extraneous condition. By way of specific example, when resistance $R_X$ is a strain gage, it responds not only to variations in the stress or strain of the element under test, but also to changes in ambient temperature: when the resistance $R_X$ is a conductivity cell, it varies not only with changes in purity of the solution, but also with changes in temperature. The effect of such extraneous variable, which may even be greater than that of the variable under measurement, may be eliminated, without detriment to the independence of lead resistance and supply voltage, by locating at least a portion of the reference resistance $R_0$ adjacent to the condition-responsive resistance $R_X$.

To give a typical case, the resistor $R_X$ may be a resistance-wire strain-gage having an initial resistance of 120 ohms. For the full range of measurement of strain of the structural member to which the gage is bonded, the corresponding change in resistance of the gage may be only 0.24 ohm, whereas the change in resistance of the gage due to variations in ambient temperature may be 0.4 ohm. Also the modulus of elasticity of the material under test may change with temperature, thereby changing the ratio of the change in resistance of $R_X$ to applied strain and so causing a "span" shift in the measurement. To correct for these extraneous variables, the temperature-sensitive resistor $R'_0$ is disposed adjacent to the strain-gage resistor $R_X$ and the resistor $R_P$ is connected in parallel to the series combination of $R'_0$ and $R_X$. The resistor $R_P$ may be adjustable to provide an initial span or calibrating adjustment.

The operation of such remote network (Fig. 3A) can be explained more simply in terms of its equivalent Y circuit (Fig. 3B) derived from Fig. 3A by use of the well-known rules of Δ-to-Y conversion. In brief, the equivalent resistors $R''_0$, $R'_X$ and $R'_C$ of Fig. 3B have values as follows:

$$(10) \quad R''_0 = \frac{R'_0 R_P}{R'_0 + R_X + R_P}$$

$$(11) \quad R'_X = \frac{R_X R_P}{R'_0 + R_X + R_P}$$

$$(12) \quad R'_C = \frac{R'_0 R_X}{R'_0 + R_X + R_P}$$

The equivalent reistance $R'_C$ is in series with a balance detector 12. Therefore no current flows through it at the time of measurement and it consequently has no effect upon the measurement. In determination of the circuit parameters, Equations 2 to 9 apply with substitution for $R_0$ and $R_X$ of $R''_0$ and $R'_X$ as defined in Equations 10 and 11 respectively. Hence, in the new balance equation corresponding with Equation 7, the terms $R'_0$, $R_X$ and $R_P$ appear only in the expression $$(13) \quad \frac{(R_X - R'_0) R_P}{R'_0 + R_X + R_P}$$

From this expression, it is evident that the measurement is a function of the difference between $R_X$ and $R'_0$ multiplied by a factor which depends upon the magnitude of resistance $R_P$, with $R'_0$ chosen to be equal to $R_X$ at a selected base level of strain, and with $R'_0$ having the same rate of change of resistance with temperature. Such expression Equation 13 will always be zero at the selected base level regardless of temperature. Thus, the base point or zero point of the measuring system is stabilized as to temperature.

Changes in the modulus of elasticity of the material under test produces span changes, which when uncompensated, modify all instrument readings by the same percentage. Since the modulus of elasticity is a multiplier coefficient related to stress and strain, and since $R_P$ of Expression 13 is a multiplier term of the detector balance equation, the measurement span may be held constant despite ambient temperature changes by having part of the resistance $R_P$ of material having negative temperature coefficient of resistance such that the multiplier term $$\frac{R_P}{R'_0+R_X+R_P}$$

of Expression 13 decreases with temperature to match the increase of the modulus of elasticity of the material with temperature. Another portion of resistance $R_P$ may be manually variable to serve as a calibration adjustment.

From the foregoing it should be evident that $R'_0$ (Fig. 3A) may be of preselected value to compensate for the aforesaid zero shift and that $R_P$ may be of preselected value to compensate for the aforesaid span shift. Unit assemblies of the three resistors $R'_0$, $R_X$ and $R_P$ may be made on production basis and, after test and adjustment at the factory, may be incorporated in different installations embodying the basic circuit of Fig. 1A without effect upon the pre-calibration by the resistance of the leads 1, 2 and 3 in any given installation.

It is often desired successively to switch a plurality of condition-responsive devices into the measuring network, as for example when it is desired to monitor temperatures existent at various points of a processing system. For uses in which the change in resistance of the condition-responsive device is quite large, no modification of the basic circuit of Fig. 1A is required except provision for switching of two of the leads 1, 2, 3, the third lead remaining common to all of the condition-responsive devices. In some cases, one of the switches is in the #3 lead to the balance detector, so that its contact resistance has no effect on the balance point; the other switch, in the #1 or #2 leads, is designed to have a resistance which is low compared to the change in resistance of $R_X$ to be measured. In other cases, the switches are respectively disposed in the #1 and #2 leads, with the #3 lead common. In the latter case, only the difference in contact resistance of the switches is effective to cause error. Such difference may be made negligibly small by selection of proper switches as originally installed and may be kept so by proper maintenance. However, when very small changes in resistance are to be measured, a threefold switching arrangement, of which Fig. 4 is an example, is preferred.

As there shown, each of the remote resistors, exemplified by resistors $R_X$ and $R''_X$, has its own set of three leads, two of which are switched, and the third of which is permanently connected to input terminal 6 of the bridge. In Figure 4, the #2 leads are permanently connected to terminal 6 of the bridge. The #3 leads (3, 3' of Fig. 4) of the remote measuring resistors are respectively connected to the corresponding fixed contacts of switch $S_1$ for selective connection by the movable contact of the switch to the terminal 11 of the balance detector. Since no current traverses this switch at balance, its contact resistance does not affect the accuracy of the measurement. The #1 leads of the remote measuring resistors (leads 1, 1' of Fig. 4) are each connected to corresponding fixed contacts of switches $S_2$ and $S_3$. The switches $S_1$, $S_2$ and $S_3$ are preferably ganged for concurrent operation to proper circuit positions. The contact resistance of switch $S_2$ is external to the bridge arms, being in series with resistor $R_1$ in the supply lead from terminal 5 of the source 17 and the input terminal 4 (or 4') of the bridge. The contact resistance of switch $S_3$ is in series with resistor $R_A$ between terminal 9 and terminal 4 (or 4') of the bridge. Since the resistors $R_1$ and $R_A$ are of high resistance compared to the contact resistance of switches $S_2$, $S_3$, the contact resistance has inappreciable effect upon the balance point of the detector, whereas switches in the leads to the measuring resistances $R_X$, $R''_X$ would introduce resistance comparable to the changes to be measured and so cause substantial measurement errors.

In the particular measuring network of Fig. 4, it is to be noted that the only resistance between reference arm terminals 4, 10' and 4', 10" is the resistance of the leads themselves; i.e., the resistance of lead $R_L$, for example, includes the reference resistor $R_0$ of Fig. 1A. The resistance of the leads of each pair should be equal, and being in adjacent arms of the bridge do not affect the balance point of the detector.

In some forms of measuring circuits utilizing an unbalanced Wheatstone bridge, all four of the bridge arms are located remotely from the detector and the power supply and one or more of them include condition-responsive impedance. In such case, four leads must extend from the remotely located bridge and it is necessary that the measurements be independent of the effect of the resistance of such leads. The methods and circuits heretofore devised in efforts to attain such independence have required additional leads, regulated or multiple power supplies, or other expedient made unnecessary by the present invention.

As exemplary of such remote bridge systems and of application of the invention thereto, reference is made to Fig. 5A in which particular circuit the four arms of the bridge 15A each comprises a strain gage. The four strain-gage resistors are initially of equal resistance R, for example, 120 ohms. Two of them disposed in opposite arms of the bridge are so mechanically coupled to the element under test that their resistances increase equally a given amount ($+\Delta R$) for a given increase in strain, whereas for the same increase in strain, the resistance of the other pair of strain gages decreases equally by the same increment ($-\Delta R$).

As in the circuit of Fig. 1A, the lead 18 from the network terminal 21A to terminal 4 of the bridge includes a resistance $R_1$: the lead 20 from network terminal 21B to terminal 6 of the bridge includes a resistance $R_2$: the intermediate terminal 8 of the first potential-divider $R_K$, $R'_K$ is connected to output terminal 9 of the bridge through the second potential-divider $R_T$. The balance detector 12, as shown, may be connected between output terminal 10 of the bridge and the tap 14 of the second potential divider $R_T$. The source 17, as shown, may be connected across the potential-divider $R_K$, $R'_K$. As stated above, the connections of the source and the balance detector to the pairs of network terminals (21A, 21B, 22A, 22B) may be interchanged. In addition, the network of Fig. 5A includes an impedance $R_S$, equal in value to $R_T$ and so treated in the subsequent equations, connected between terminal 8 of the first divider network $R_K$, $R'_K$ and terminal 11 of the balance detector 12. The purpose of resistor $R_S$ is to provide that at balance of the detector, there is flow of current through the resistance of lead 3 which balances the effect of flow of current through the resistance of lead 19. In the equivalent circuit (Fig. 5B) of Fig. 5A, the distributed resistances of leads 3, 18, 19 and 20 are equal and identified as resistance $R_L$. As in Fig. 1B, the voltage divider $R_K$, $R'_K$ is replaced by an equivalent phantom source and its effective series impedance. The voltage KE of such phantom source is given in Equation 2, the proportionality factor K being $$\frac{R_K}{R_K+R'_K}$$

The resistance $R_E$ of Fig. 5B includes the effective internal series-impedance $$\frac{R_K R_{K'}}{R_K+R'_K}$$

of the phantom source and may also include any additional resistance between terminal 8 and the junction of $R_S$ and $R_T$.

In the following analysis of Fig. 5B, it is assumed that the maximum change in resistance $\Delta R$ of the strain gage is small compared to their initial magnitude R and that the fraction $n$ of resistance $R_T$ is also small, i.e., of the same order of magnitude as $$\frac{\Delta R}{R}$$

Under these assumptions, which are valid for practical circuit design, the condition for balance of detector 12 may be expressed as (14)

$$n\left(R_T+R_L+\frac{R}{2}\right)[2K(R_1+R_2+R+2R_L)-(R+2R_2+2R_L)]$$

$$=2\Delta R\left[K(R_1-R_2)+2R_E+R_T+2R_L+R_2+\frac{R}{2}\right]$$

To obtain perfect compensation of the effect of lead resistance upon detector balance, the values of $K$ and $R_E$ are so chosen that

(15) $$K=\frac{R_K}{R_K+R'_K}=\frac{1}{2}$$

and

(16) $$R_E=\frac{R_E}{2}+\frac{R-(R_1+R_2)}{4}$$

With these values of $K$ and $R_E$ substituted in Equation 14, the new balance equation for the detector 12 of Fig. 5A becomes

(17) $$n=\frac{4\Delta R}{R_1-R_2}$$

As discussed in connection with Fig. 1A, the detector balance for the different magnitudes of the condition under measurement or control may be effected by adjustment of contact 14 of a slidewire forming all or part of the potential-divider impedance $R_T$. Such adjustment may be effected automatically and concurrently with movement of a recorder pen or indicator or may be made manually in setting of a control point to be maintained by automatic control of the measured condition.

Less perfect but adequate compensation for the resistance of leads 3, 18, 19 and 20 can be obtained by making $$K=\frac{1}{2}$$

as before and disregarding Equation 16 but providing that the second potential-divider $R_T$ shall be of resistance much higher than any of the other resistors of the networks. In such case the expression for the term $n$ at balance closely approximates

(18) $$n=\frac{2\Delta R}{R_1-R_2}\left(1+\frac{R_1+R_2+4R_E+2R_L}{2R_T}\right)$$

From Equation 18, it appears that the only effect of the lead resistance $R_L$ is a slight change of the span of the measuring system. The change in span is proportional to $$\frac{R_L}{R_T}$$

so that in practice the span change may be made negligibly small. For example, $R_T$ may be chosen as 25,000 ohms so that a change in lead resistance of as much as 10 ohms does not produce a span change of more than one part in 2500. To complete a specific example, the strain gages may be of approximately 120 ohms resistance and the change in their resistance over the complete range of measurement may be approximately one part in 500. In such case, the resistance of resistor $R_2$ may be essentially zero; the resistance of resistor $R_1$ may be 120 ohms. In such case, the fraction $n$ will therefore change about two parts in 500 over the complete range of measurement when Equation 18 applies and about four parts in 500 when Equation 17 applies. The slidewire portion of the total resistance $R_T$ will be of low value, such as 100 ohms, giving an expanded scale with the readings for all practical purposes independent of the lead resistance.

Compensation for the effect of temperature upon the modulus of elasticity of the material under test may be obtained by selecting for a portion of the total resistance $R_1$ a resistor having a positive temperature coefficient and/or selecting for a portion of the total resistance $R_2$ a resistor having a negative temperature coefficient. Reverting to Equation 17, it is evident that if $\Delta R$ changes by any fixed percentage for a given change in temperature, perfect temperature compensation is obtained when the difference between $R_1$ and $R_2$ also changes by the same percentage.

With the temperature compensation resistor in lead 18 and with the difference between $R_1$ and $R_2$ equal to the initial resistance $R$ of the bridge arms, the relationship between the slidewire setting ($n$) and the change $\Delta R$ simply becomes

(19) $$n=\frac{4\Delta R}{R}$$

It shall be understood the invention is not limited to the particular embodiments illustrated and described but includes equivalent arrangements within the scope of the appended claims.

What is claimed is:

1. A measuring network comprising a first impedance means having an intermediate point to serve as a first potential divider and whose end terminals provide a first conjugate pair of network terminals, a Wheatstone bridge having a first pair of adjacent arms and condition-responsive impedance means in at least one of the other pair of bridge arms, connections from said end terminals of said first impedance means to the end terminals of said first pair of arms, at least one of said connections including second impedance means to effect a predetermined substantial difference between the impedances of said connections, a third impedance means connected between said intermediate point of said first impedance means and the junction of said first pair of arms, said third impedance means having an intermediate point to serve as a second potential divider, said intermediate point of said third impedance means and the junction of said other pair of bridge arms providing a second conjugate pair of network terminals, a current-supply means connected to said first conjugate pair of network terminals, and a detector connected to said second conjugate pair of network terminals for response to the difference between the unbalance voltage of said bridge and the voltage between said intermediate point of said third impedance means and the junction of said first pair of adjacent bridge arms.

2. A measuring network as in claim 1 in which said point of the second potential-divider is adjustable to effect balance of said voltages applied to the detector.

3. A measuring network as in claim 1 in which the current-supply means comprises a tapped-winding having end terminals respectively connected to said one pair of said bridge terminals to supply current thereto and having its tap connected to said third impedance means whereby said winding also serves as said first potential-divider.

4. A measuring network as in claim 1 in which the bridge including said condition-responsive impedance means is connected by four leads to the remainder of the network, in which the intermediate point of said first impedance means is electrically midway thereof, and an additional impedance means of magnitude equal to said second potential-divider and connected between said intermediate point and the network terminal connected to said junction of said other pair of bridge arms, the midway location of said intermediate point and the magnitude of said additional impedance means substantially eliminating at balance of said detector the effect of the impedance of said four leads.

5. A measuring network as in claim 4 in which said point of the second potential-divider is adjustable to effect null response of the detector at the existing magnitudes of the condition under measurement.

6. A measuring network as in claim 4 in which the effective impedance ($R_E$) in series between said midway point of the first potential-divider and said second potential-divider is $$R_E = \frac{R_T}{2} + \frac{R - (R_1 + R_2)}{4}$$

where $R_T$ is the impedance of the additional impedance means,
$R_1 + R_2$ is the second impedance,
$R$ is the initial impedance of each bridge arm.

7. A measuring network comprising a first impedance means having an intermediate point to serve as a first potential divider and whose end terminals provide a first conjugate pair of network terminals, a Wheatstone bridge having a first pair of adjacent arms connected in series between one pair of bridge terminals, connections from said end terminals of said first impedance means to said pair of bridge terminals, at least one of said connections including second impedance means to effect a predetermined substantial difference between the impedances of said connections, a third impedance means connected between said intermediate point of said first impedance means and the junction of said first pair of arms, said third impedance means having an intermediate point to serve as a second potential divider, remote condition-responsive impedance means connected to the remainder of said network by three leads, two of said leads being of equal resistance and included in a second pair of adjacent bridge arms connected in series between said pair of bridge terminals, and the third of said leads extending from the junction of said second pair of bridge arms to one of a second conjugate pair of network terminals, the other one of said second conjugate pair of network terminals being said intermediate point of said third impedance means, a current-supply source connected to one pair of said conjugate pairs of network terminals, and a detector connected to the other pair of said conjugate pairs of network terminals, the relation of the magnitudes of said first impedance means, said second impedance means and said first pair of arms substantially eliminating at balance of said detector the effect of the impedances of said leads.

8. A measuring network as in claim 7, in which $R_A$ is the impedance of each of the two adjacent arms having their junction connected to said third impedance, in which $R_1$ and $R_2$ are components of the second impedance means respectively disposed in the said connections of the first impedance means to the bridge, in which $R_K$ is that component of the first impedance means which is connected between its intermediate point and $R_1$, in which $R'_K$ is that component of the first impedance means connected between its intermediate point and $R_2$, and in which the relative magnitudes of the first, second and third impedance means are preselected in accordance with $$\frac{R_A + R_2}{R_1 + R_2 + 2R_A} = \frac{R_K}{R_K + R'_K}$$

9. A measuring network as in claim 7 in which the condition-responsive means responds both to the primary condition to be measured and to an extraneous condition, and in which at least one of the arms of said second pair of adjacent arms includes impedance means responsive to said extraneous condition for compensation of the effect thereof upon measurements of the primary condition.

10. A measuring network as in claim 9 and respectively in different arms of which impedance means is connected between points in said second pair of adjacent arms and responds to said extraneous condition in compensation for the effect thereof upon the span of measurement.

11. A measuring network as in claim 10 in which said span-compensating impedance means is adjustable to set the measuring span.

12. A measuring network comprising a first impedance means having an intermediate point to serve as a first potential divider and whose end terminals provide a first conjugate pair of network terminals, a Wheatstone bridge having a pair of adjacent arms, a second impedance means connected between the junction of said adjacent arms and said intermediate point of said first impedance means, said second impedance means having an intermediate point to serve as a second potential divider, a connection from one end terminal of said first impedance means and the end terminal of one of said adjacent arms, a plurality of remote condition-responsive means each having a set of three leads, the first lead of each set being connected to the said end terminal of one of said adjacent arms, a third impedance means connected to the other end terminal of said first impedance means, three switches for selectively including said condition-responsive means in said measuring network, the first of said switches being connected in series with said third impedance means and having its fixed contacts respectively connected to the second lead of each set, the second of said switches being in series with the other of said adjacent arms and having its fixed contacts respectively connected to said second lead of each set, and a third switch having its fixed contacts respectively connected to the third lead of each set, said third switch and said intermediate point of said second potential divider providing a second conjugate pair of network terminals, a current-supply means connected to one pair of said conjugate pairs of network terminals, and a detector connected to the other pair of said conjugate pairs of network terminals, the second and first leads of each set being of equal impedance and the relative magnitudes of the impedances of said adjacent arms and of the first and second impedance means being preselected to eliminate at balance of said detector the effect of the impedances of said leads.

13. A measuring network having two conjugate pairs of terminals, a detector connected to one pair of said network terminals, a current-supply source connected to the other pair of said network terminals, a first impedance means connected between one pair of said network terminals and having an intermediate point, a Wheatstone bridge having a first pair of adjacent arms and condition-responsive means in at least one of a second pair of adjacent arms, connections from the end terminals of said first pair of adjacent bridge arms to the end terminals of said first impedance means, at least one of said connections including a second impedance means to effect a predetermined substantial difference between the impedances of said connections, and a third impedance means connected between said intermediate point of said first impedance means and the junction of said first pair of adjacent bridge arms, said third impedance means having an intermediate point, said intermediate point of the third impedance means and the junction of said second pair of adjacent bridge arms being the second pair of said network terminals.

References Cited in the file of this patent

UNITED STATES PATENTS 2,846,645   Ruge _____ Aug. 5, 1958

OTHER REFERENCES

George: "Bridge and E.M.F. Measurements via the Resistance Bridge Indicator," Instruments and Automation, pp. 2061–2063, November 1957.

UNITED STATES PATENT OFFICE
CERTIFICATION OF CORRECTION

Patent No. 2,980,852                                                April 18, 1961

Thomas L. Mell

It is hereby certified that error appears in the above numbered patent requiring correction and that the said Letters Patent should read as corrected below.

Column 5, line 69, for "perssure" read -- pressure --; column 9, lines 25 and 26, for that portpn of equation (16) reading $$\frac{R_E}{2} \quad \text{read} \quad \frac{R_T}{2}$$

Signed and sealed this 29th day of August 1961.

(SEAL)
Attest:

ERNEST W. SWIDER                                        DAVID L. LADD
Attesting Officer                                             Commissioner of Patents